United States Patent
Nakano

(10) Patent No.: US 7,193,731 B2
(45) Date of Patent: Mar. 20, 2007

(54) OPTICAL DISPLACEMENT SENSOR

(75) Inventor: Takahiko Nakano, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 118 days.

(21) Appl. No.: 10/669,347

(22) Filed: Sep. 25, 2003

(65) Prior Publication Data

US 2004/0061872 A1    Apr. 1, 2004

(30) Foreign Application Priority Data

Sep. 26, 2002    (JP) .............................. 2002-280877

(51) Int. Cl.
*G01B 11/14* (2006.01)
*G02B 27/40* (2006.01)

(52) U.S. Cl. ..................... 356/623; 356/602; 356/614; 250/201.2

(58) Field of Classification Search ........ 356/601–624, 356/4.04; 250/559.23, 559.31, 559.38, 201, 250/205, 208.1, 208.2, 201.2, 559.07, 559.06, 250/201.6

See application file for complete search history.

(56) References Cited

U.S. PATENT DOCUMENTS

| | | | | |
|---|---|---|---|---|
| 3,520,607 A | * | 7/1970 | Zoot ........................... | 356/4.05 |
| 3,740,563 A | * | 6/1973 | Reichard ..................... | 117/15 |
| 4,373,816 A | * | 2/1983 | Laib ............................ | 356/623 |
| 4,464,038 A | * | 8/1984 | Nanba ......................... | 396/106 |
| 4,548,504 A | * | 10/1985 | Morander ................... | 356/623 |
| 4,647,193 A | * | 3/1987 | Rosenfeld .................. | 356/4.04 |
| 4,748,333 A | * | 5/1988 | Mizutani et al. .......... | 250/559.07 |
| 4,864,147 A | * | 9/1989 | Ikari et al. .............. | 250/559.22 |
| 4,897,536 A | * | 1/1990 | Miyoshi ................... | 250/201.6 |
| 4,970,384 A | * | 11/1990 | Kambe et al. ............... | 250/221 |
| 5,065,526 A | * | 11/1991 | Breyer ......................... | 33/702 |
| 5,113,080 A | * | 5/1992 | Leu et al. .............. | 250/559.31 |
| 5,218,427 A | * | 6/1993 | Koch ......................... | 356/602 |
| 5,488,468 A | * | 1/1996 | Kawanishi et al. ........ | 356/4.01 |
| 5,519,204 A | * | 5/1996 | Rudd et al. ................. | 250/205 |
| 5,652,432 A | * | 7/1997 | Yaginuma .............. | 250/559.06 |
| 5,923,427 A | * | 7/1999 | Dong ......................... | 356/623 |
| 6,122,039 A | * | 9/2000 | Schumacher ............... | 356/3.07 |
| 6,141,104 A | * | 10/2000 | Schulz et al. ............... | 356/616 |
| 6,492,652 B2 | * | 12/2002 | Muller .................. | 250/559.38 |
| 6,563,098 B2 | * | 5/2003 | Gweon et al. ........... | 250/201.2 |
| 6,741,363 B1 | * | 5/2004 | Kaupert ..................... | 356/602 |
| 6,839,144 B2 | * | 1/2005 | Okada et al. ............... | 356/606 |

FOREIGN PATENT DOCUMENTS

| | | |
|---|---|---|
| JP | 4-174923 A | 6/1992 |
| JP | 5-87526 A | 4/1993 |
| JP | 05-164554 | 6/1993 |
| JP | 10-026524 | 1/1998 |
| JP | 10-132559 | 5/1998 |
| JP | 2000-205842 | 7/2000 |
| JP | 2002-156208 | 5/2002 |

* cited by examiner

*Primary Examiner*—Sang H. Nguyen
(74) *Attorney, Agent, or Firm*—Birch, Stewart, Kolasch & Birch, LLP

(57) ABSTRACT

Optical displacement sensor may possess light-emitting element(s) for projecting light onto distance measurement target(s), and light-receiving element(s) capable of receiving light reflected from distance measurement target(s) and disposed such that light-receiving surface(s) thereof is or are substantially perpendicular to optical axis or axes R1 of projected light. Furthermore, such optical displacement sensor(s) may be equipped with slit(s) capable of narrowing light beam(s) projected toward distance measurement target(s), and slit(s) capable of narrowing light reflected from distance measurement target(s).

6 Claims, 4 Drawing Sheets

OPTICAL DISPLACEMENT SENSOR

CROSS-REFERENCE TO RELATED APPLICATION/PRIORITY

The present application claims right of benefit of prior filing date of Japanese Patent Application No. 2002-280877, the content of which is incorporated herein by reference in its entirety. Furthermore, all references cited in the present specification are specifically incorporated herein by reference in their entirety.

BACKGROUND OF INVENTION

1. Field of the Invention

The present invention pertains to an optical displacement sensor capable of detecting displacement of a target to which distance is measured by projecting light and receiving such light after reflection thereof.

2. Related Art

Triangulation-type displacement sensors capable of detecting displacement of a target to which distance is measured by projecting light and receiving such light after reflection thereof have been proposed conventionally (e.g., see Japanese Patent Application Publication Kokai No. H4-174923 (1992) and Japanese Patent Application Publication Kokai No. H5-87526 (1993).

FIG. 5 shows a displacement sensor described at Japanese Patent Application Publication Kokai No. H4-174923 (1992).

This displacement sensor consists of light-emitting element 103 for causing light for detection to be projected more or less perpendicularly with respect to distance measurement target 107, light-projecting Fresnel lens 104 arranged in front of light-emitting element 103, light-collecting Fresnel lens 113 for collecting light reflected from distance measurement target 107, and optical position sensing detector (PSD) 110 for detecting light collected by light-collecting Fresnel lens 113, the optical axis of light-collecting Fresnel lens 113 being arranged in a direction perpendicular to the light-receiving surface of PSD 110 and the optical axis of light-projecting Fresnel lens 104.

Furthermore, FIG. 6 shows a displacement sensor described at Japanese Patent Application Publication Kokai No. H5-87526 (1993).

This displacement sensor consists of light-emitting element 120 for causing light for detection to be projected more or less perpendicularly with respect to distance measurement target 117, light-collecting lens (convex lens) 121 arranged in front of light-emitting element 120, pinhole 124 for allowing light reflected from distance measurement target 117 to pass therethrough, and optical position sensing detector (PSD) 122 for detecting light which has passed through pinhole 124, PSD 122 being arranged such that the light-receiving surface thereof is parallel to the optical axis O of the light for detection.

The displacement sensor described at the aforementioned Japanese Patent Application Publication Kokai No. H4-174923 (1992) is such that light-collecting Fresnel lens 113 is used to collect light from light-emitting element 103 when light is projected onto distance measurement target 107. Furthermore, the displacement sensor in Patent Reference No. 2, above, is such that light-collecting lens (convex lens) 121 is used to collect light from light-emitting element 120.

Where light-collecting Fresnel lens 113, light-collecting lens (convex lens) 121, or other such light-collecting element is used, this has presented a problem in that it has been necessary to set the distance between the light-collecting element and the light-receiving element to a prescribed distance; and moreover, the fact that some prescribed size is required for the light-collecting element has caused the dimensions of the overall displacement sensor to increase.

Furthermore, in the case of the displacement sensor described at Japanese Patent Application Publication Kokai No. H4-174923 (1992), light-collecting Fresnel lens 113 is used as means for guiding light reflected from distance measurement target 107 to PSD 110, and this has also contributed to increase in the dimensions of the displacement sensor.

Furthermore, in the case of the displacement sensor described at Japanese Patent Application Publication Kokai No. H5-87526 (1993), pinhole 124 is used as means for guiding light reflected from distance measurement target 117 to PSD 122. Now, it being necessary that the reflected light which is guided by pinhole 124 be incident on the light-receiving surface of PSD 122 in order for detection of that light to occur, the narrowness of that light beam has made it necessary to either increase the precision with which PSD 122 is positioned or increase the dimensions of the light-receiving surface of PSD 122. Furthermore, depending upon the environment in which this displacement sensor is used, dust may accumulate at pinhole 124 or may invade the interior of the sensor from pinhole 124. Under such conditions, it has sometimes occurred that light reflected from distance measurement target 117 is blocked at pinhole 124 or at the sensor interior, impairing the detection capability of the displacement sensor.

The present invention was conceived in order to solve such problems, it being an object thereof to provide an optical displacement sensor which is both thin and small. It is moreover an object thereof to provide an optical displacement sensor whose detection capability is not impaired by dust or the like.

SUMMARY OF INVENTION

To solve the above problems, the present invention is concerned with a triangulation-type optical displacement sensor having one or more light-emitting elements for projecting light onto one or more targets to which one or more distances is or are to be measured, and one or more light-receiving elements, at least one of the light-receiving element or elements receiving at least a portion of the light reflected from at least one of the distance measurement target or targets and such that at least one light-receiving surface thereof is substantially perpendicular to at least one optical axis of at least a portion of the projected light, comprising: one or more slits narrowing one or more light beams projected toward at least one of the distance measurement target or targets, and one or more slits narrowing at least a portion of the light reflected from at least one of the distance measurement target or targets. That is, such the present invention may employ constitution(s) wherein projected light and reflected light are both narrowed by slit(s). In particular, position(s) of slit(s) narrowing light reflected from distance measurement target(s) may be set based on triangulation principles. This being the case, since distance (s) between light-emitting element(s) and slit(s) narrowing light beam(s) projected onto distance measurement target(s) may to a certain extent be chosen freely, it will be possible to construct a displacement sensor which is thin; and moreover, since such slit(s) is or are small itself or themselves, it will be possible to construct a displacement sensor which is small.

Here, one or more filters may be arranged at the exit side of at least one of the slit or slits narrowing one or more light beams projected toward at least one of the distance measurement target or targets, and one or more filters may be arranged at the incident side of at least one of the slit or slits narrowing at least a portion of the light reflected from at least one of the distance measurement target or targets. As a result of such provision of filter(s), in the event that dust accumulates in the vicinity of slit(s), it will be possible to easily remove such dust and it will be possible to prevent such dust from invading the sensor interior from slit(s). This being the case, it will be possible to prevent dust from impairing the detection capability of the displacement sensor.

Furthermore, the present invention is concerned with a triangulation-type optical displacement sensor having one or more light-emitting elements for projecting light onto one or more targets to which one or more distances is or are to be measured, and one or more light-receiving elements, at least one of the light-receiving element or elements receiving at least a portion of the light reflected from at least one of the distance measurement target or targets and disposed such that at least one light-receiving surface thereof is substantially perpendicular to at least one optical axis of at least a portion of the projected light, comprising: one or more slits narrowing one or more light beams projected toward at least one of the distance measurement target or targets, and one or more light collecting elements collecting at least a portion of the light reflected from at least one of the distance measurement target or targets; and at least one of the light collecting element or elements may be a cylindrical lens. That is, such the present invention may employ constitution(s) wherein reflected light is narrowed by slit(s). Position(s) of slit(s) narrowing light reflected from distance measurement target(s) may be set based on triangulation principles. This being the case, since distance(s) between light-emitting element(s) and such light-collecting element(s) may to a certain extent be chosen freely, it will be possible to construct a displacement sensor which is thin; and moreover, since such slit(s) is or are small itself or themselves, it will be possible to construct a displacement sensor which is small.

Here, one or more filters may be arranged at the exit side of at least one of the slit or slits narrowing one or more light beams projected toward at least one of the distance measurement target or targets. As a result of such provision of filter(s), in the event that dust accumulates in the vicinity of slit(s), it will be possible to easily remove such dust and it will be possible to prevent such dust from invading the sensor interior from slit(s). This being the case, it will be possible to prevent dust from impairing the detection capability of the displacement sensor.

DESCRIPTION OF INVENTION

Below, embodiments of the present invention are described with reference to the drawings.

(Embodiment 1)

Figure 1:
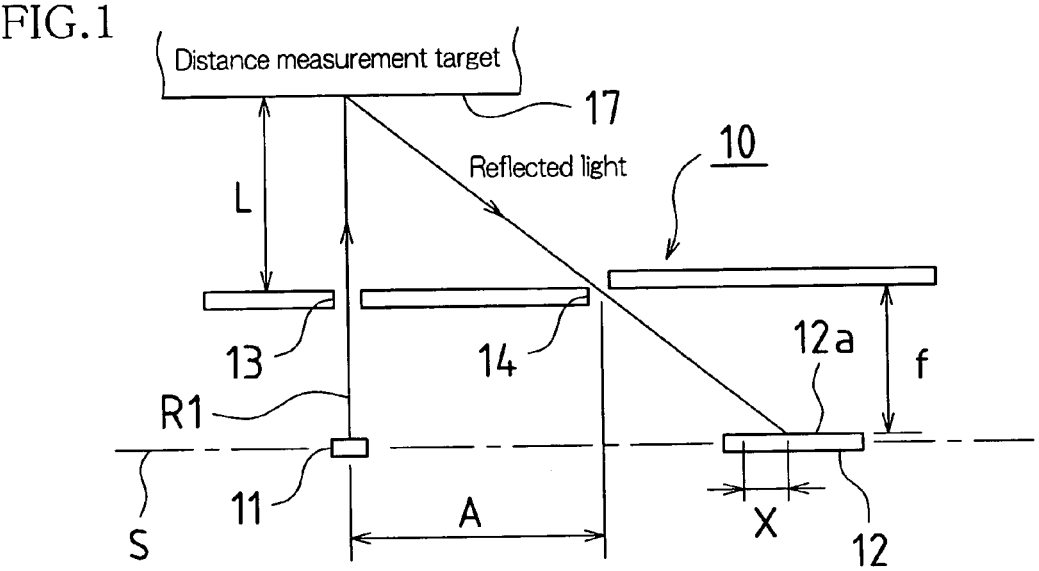
FIG. 1 is a schematic diagram showing the constitution of Embodiment 1 of the optical displacement sensor of the present invention.

FIG. 1 is a drawing showing basic constitution of the optics in an optical displacement sensor (hereinafter simply "displacement sensor") in accordance with the present Embodiment 1.

This displacement sensor 10, being equipped with light-emitting element 11 and light-receiving element 12 provided along prescribed reference line S, possesses distance measurement range L.

Light-emitting element 11 is, in the present Embodiment 1, a light emitting diode or other such light source, light beam R1 exiting light-emitting element 11 being narrowed by slit 13, which comprises a small opening disposed in the optical path in front of the region at which light beam R1 exits therefrom, to be projected onto distance measurement target 17.

Light-receiving element 12 is, in the present Embodiment 1, a PSD (semiconductor position sensing detector), light diffusely reflected by distance measurement target 17 being narrowed by slit 14, which comprises a small opening disposed in front of light-receiving surface 12a, to be guided to light-receiving surface 12a.

Light beam R1 exiting light-emitting element 11 passes through slit 13 to be projected onto distance measurement target 17, and a portion of the light diffusely reflected by distance measurement target 17 passes through slit 14, the light narrowed thereby being incident on light-receiving surface 12a.

The location at which this incident light is incident on light-receiving surface 12a varies as a function of the distance between distance measurement target 17 and light-receiving element 12. When the location at which this incident light is incident on light-receiving surface 12a changes relative to a reference location thereon, the relative intensities of the output signal currents respectively extracted from either end of light-receiving element 12 vary in correspondence to the amount of such change. By using a controller signal processing circuit (not shown) to detect such alteration in relative intensities, it is possible to detect the distance between the distance measurement target 17 and light-receiving element 12.

The location of slit 13, which narrows light beam R1 exiting light-emitting element 11, and the spacing relative to the opening thereof may be set based on a prescribed size for the spot to be formed by the light beam which is projected onto distance measurement target 17.

Furthermore, the location of slit 14, which guides to light-receiving surface 12a a portion of the light diffusely reflected by distance measurement target 17, may be set based on Formula (1), below, in accordance with triangulation principles.

$$x = (Af)/L \qquad (1)$$

where x=amount of movement of spot of light at light-receiving surface 12a of light-receiving element 12; A=distance between light-emitting element 11 and slit 14 in the direction of reference line S; f=distance between light-receiving element 12 and slit 14 in a direction perpendicular to reference line S; and L=range of measurable distances.

Since the distance between slit 13 and light-emitting element 11 may thus to a certain extent be chosen freely, it will be possible to construct a displacement sensor which is thin; and moreover, since slit 13 is itself small, it will be possible to construct a displacement sensor which is small.

Furthermore, because slit 14 has an opening that is long in a direction (the direction perpendicular to the plane of the paper (FIG. 1)) perpendicular to the long direction (the direction of reference line S) of light-receiving element 12, the spot of reflected light at light-receiving surface 12a will be formed in a direction (the direction perpendicular to the plane of the paper (FIG. 1)) perpendicular to the long direction (the direction of reference line S) of light-receiving element 12. This makes positioning of light-receiving element 12 comparatively easy to accomplish, and moreover permits reduction in the width (i.e., the dimension perpendicular to the direction of movement of the spot of light thereon and perpendicular to the plane of the paper (FIG. 1)) of light-receiving surface 12a.

(Embodiment 2)

Figure 2:
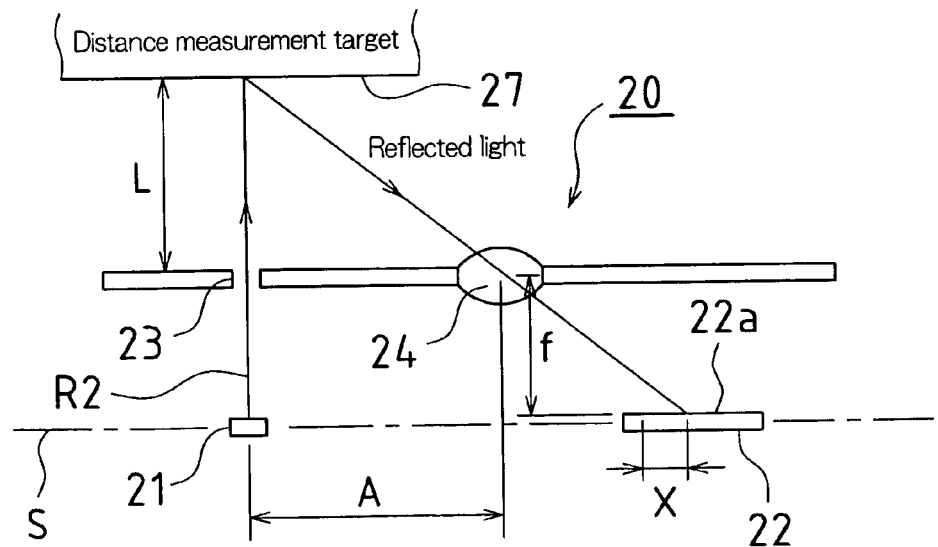
FIG. 2 is a schematic diagram showing the constitution of Embodiment 2 of the optical displacement sensor of the present invention.

FIG. 2 is a drawing showing basic constitution of the optics in a displacement sensor 20 in accordance with the present Embodiment 2.

This displacement sensor 20, being equipped with light-emitting element 21 and light-receiving element 22 provided along prescribed reference line S, possesses distance measurement range L.

Light-emitting element 21 is, in the present Embodiment 2, a light emitting diode or other such light source, light beam R2 exiting light-emitting element 21 being narrowed by slit 23, which comprises a small opening disposed in the optical path in front of the region at which light beam R2 exits therefrom, to be projected onto distance measurement target 27.

Light-receiving element 22 is, in the present Embodiment 2, a PSD (semiconductor position sensing detector), light diffusely reflected by distance measurement target 27 being narrowed by light collecting element 24, which is disposed in front of light-receiving surface 22a, to be guided to light-receiving surface 22a.

Operation of displacement sensor 20 constituted in such fashion being similar to that at Embodiment 1, above, description of operation will be omitted here.

The location of light collecting element 24, which guides to light-receiving surface 22a a portion of the light diffusely reflected by distance measurement target 27, may be set based on Formula (1), above, in accordance with triangulation principles.

Light collecting element 24 may, for example, be an optical element such as a cylindrical lens, in which case it should exhibit light-condensing capability in the long direction of light-receiving surface 22a.

(Embodiment 3)

Figure 3:
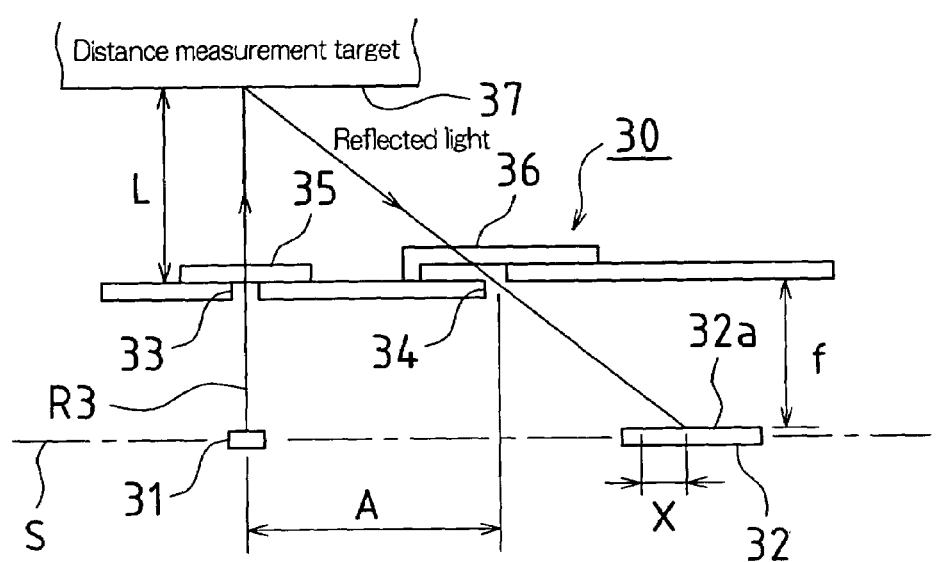
FIG. 3 is a schematic diagram showing the constitution of Embodiment 3 of the optical displacement sensor of the present invention.

FIG. 3 is a drawing showing basic constitution of the optics in a displacement sensor 30 in accordance with the present Embodiment 3.

This displacement sensor 30, being equipped with light-emitting element 31 and light-receiving element 32 provided along prescribed reference line S, possesses distance measurement range L.

Light-emitting element 31 is, in the present Embodiment 3, a light emitting diode or other such light source, light beam R3 exiting light-emitting element 31 being narrowed by slit 33, which comprises a small opening disposed in the optical path in front of the region at which light beam R3 exits therefrom, and passing through filter 35, which is arranged at the exit side of slit 33, to be projected onto distance measurement target 37.

Light-receiving element 32 is, in the present Embodiment 3, a PSD (semiconductor position sensing detector), light diffusely reflected by distance measurement target 37 passing through filter 36, which is arranged at the incident side of slit 34, and being narrowed by slit 34, which comprises a small opening disposed in front of light-receiving surface 32a, to be guided to light-receiving surface 32a.

Operation of displacement sensor 30 constituted in such fashion being similar to that at Embodiment 1, above, description of operation will be omitted here.

As a result of such respective attachment of filters 35, 36 to both slits 33, 34, in the event that dust accumulates in the vicinity of slits 33, 34, such dust may be removed therefrom by following a prescribed procedure, and moreover, it will be possible to prevent such dust from invading the sensor interior from slits 33, 34. It will therefore be possible to prevent the detection capability of displacement sensor 30 from being impaired by dust. Note that so long as filters 35, 36 respectively permit removal of dust and make it possible to prevent dust from invading the sensor interior, the shapes thereof are not limited to those shown at FIG. 3.

(Embodiment 4)

Figure 4:
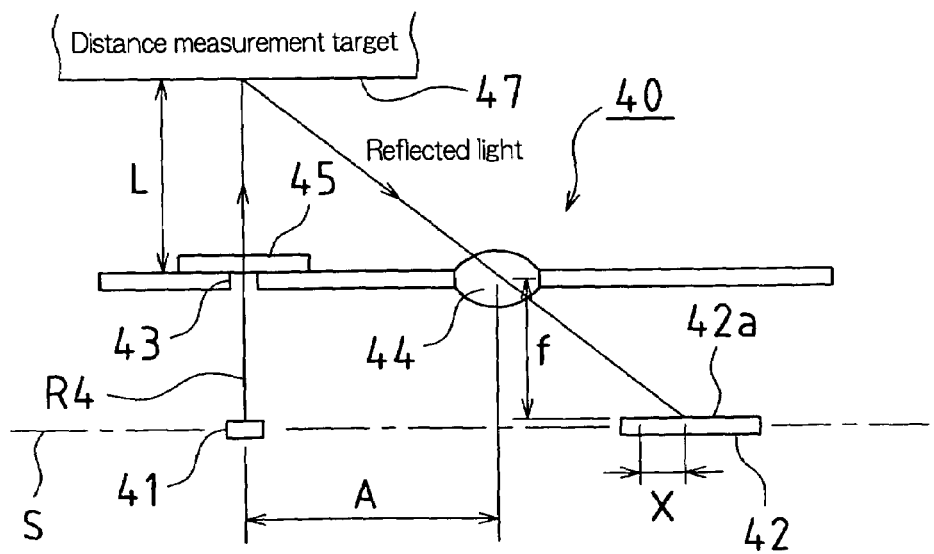
FIG. 4 is a schematic diagram showing the constitution of Embodiment 4 of the optical displacement sensor of the present invention.
Figure 5:
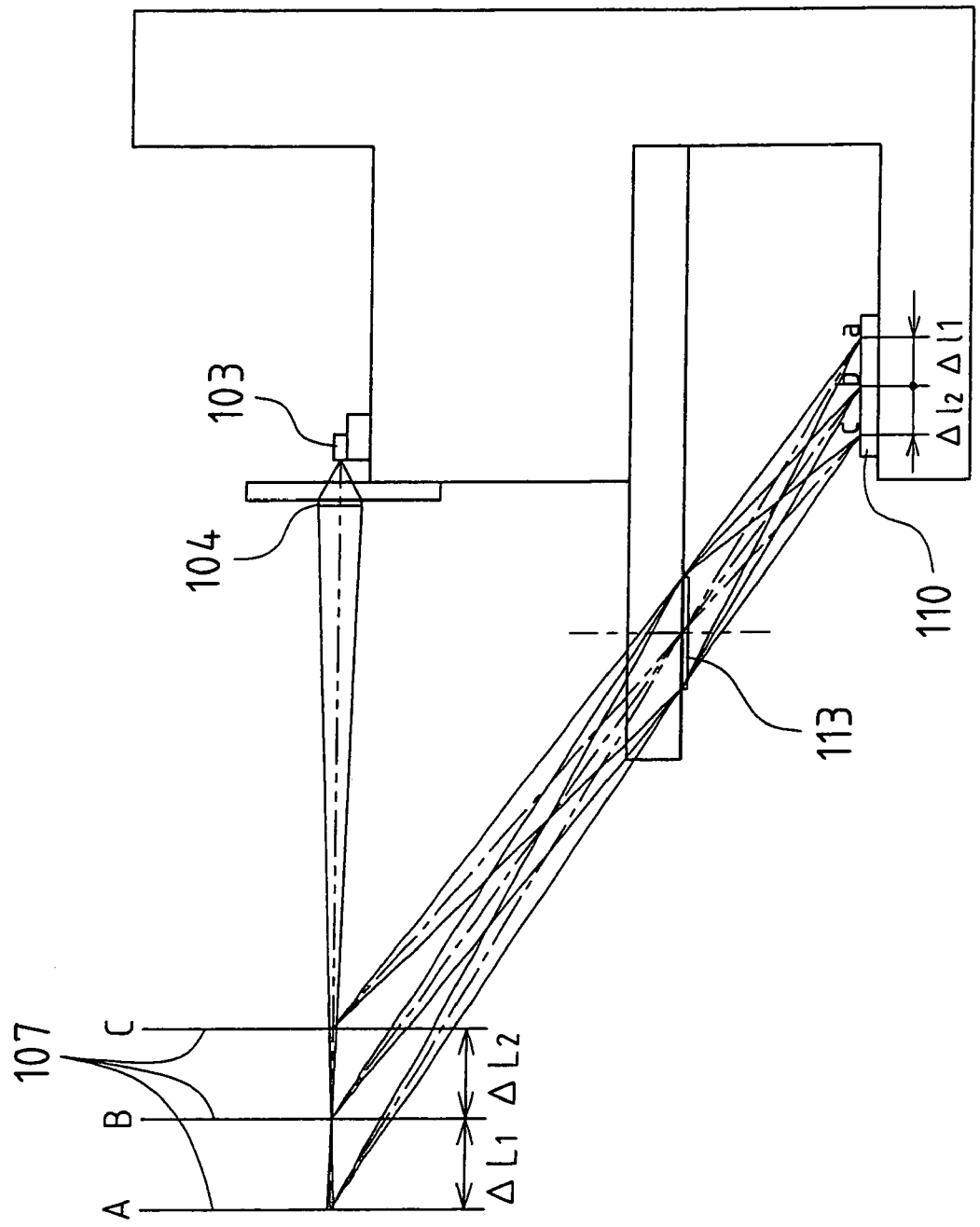
FIG. 5 is a schematic diagram showing one example of the constitution of a conventional displacement sensor.
Figure 6:
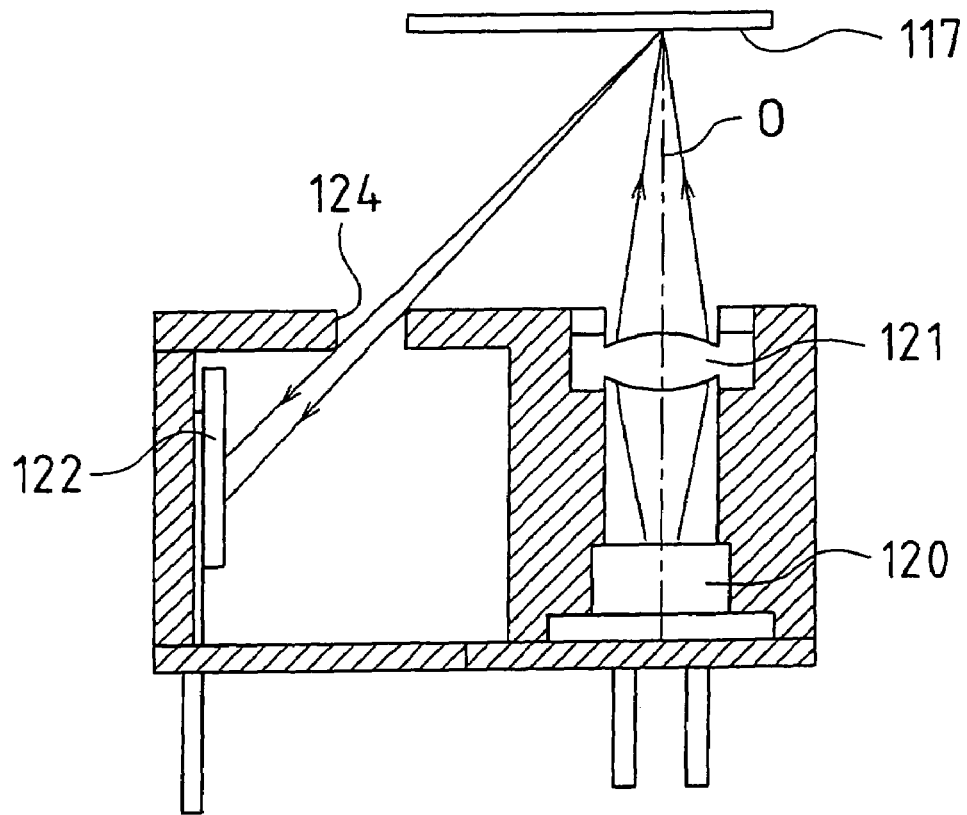
FIG. 6 is a schematic diagram showing another example of the constitution of a conventional displacement sensor.

FIG. 4 is a drawing showing basic constitution of the optics in a displacement sensor 40 in accordance with the present Embodiment 4.

This displacement sensor 40, being equipped with light-emitting element 41 and light-receiving element 42 provided along prescribed reference line S, possesses distance measurement range L.

Light-emitting element 41 is, in the present Embodiment 4, a light emitting diode or other such light source, light beam R4 exiting light-emitting element 41 being narrowed by slit 43, which comprises a small opening disposed in the optical path in front of the region at which light beam R4 exits therefrom, and passing through filter 45, which is arranged at the exit side of slit 43, to be projected onto distance measurement target 47.

Light-receiving element 42 is, in the present Embodiment 4, a PSD (semiconductor position sensing detector), light diffusely reflected by distance measurement target 47 being narrowed by light collecting element 44, which is disposed in front of light-receiving surface 42a, to be guided to light-receiving surface 42a.

Operation of displacement sensor 40 constituted in such fashion being similar to that at Embodiment 1, above, description of operation will be omitted here.

The location of light collecting element 44, which guides to light-receiving surface 42a a portion of the light diffusely reflected by distance measurement target 47, may be set based on Formula (1), above, in accordance with triangulation principles.

Light collecting element 44 may, for example, be an optical element such as a cylindrical lens, in which case it should exhibit light-condensing capability in the long direction of light-receiving surface 42a.

As a result of such attachment of filter 45 to slit 43, in the event that dust accumulates in the vicinity of slit 43, such dust may be removed therefrom by following a prescribed procedure, and moreover, it will be possible to prevent such dust from invading the sensor interior from slit 43. It will therefore be possible to prevent the detection capability of displacement sensor 40 from being impaired by dust. Note that so long as filter 45 permits removal of dust and makes it possible to prevent dust from invading the sensor interior, the shape thereof is not limited to that shown at FIG. 4.

As described above, the optical displacement sensor of the present invention is such as to permit attainment of a displacement sensor which is both thin and small, permitting reduction in the space occupied thereby when installed in equipment.

What is claimed is:

1. A triangulation-type optical displacement sensor having at least one light-emitting element for projecting light onto at least one target to which one or more distances being measured, and at least one light-receiving element for receiving at least a portion of the light reflected from at least one of the distance measurement targets and being disposed such that at least one light-receiving surface thereof is substantially perpendicular to at least one optical axis of at least a portion of the projected light, comprising:

at least one slit for narrowing at least one light beam projected toward at least one of the distance measurement targets, and said at least one slit for narrowing at least a portion of the light reflected from said at least one of the distance measurement targets, wherein said at least one slit for narrowing at least one light beam projected toward said at least one of the distance measurement targets is independent from said at least one slit for narrowing at least a portion of the light reflected from said at least one of the distance measurement targets.

2. An optical displacement sensor according to claim 1, wherein at least one filter being arranged at an exit side of at least one of the slits narrowing at least one of the light beams projected toward at least one of the distance measurement targets, and said at least one filter being arranged at the incident side of at least said one of the slits narrowing at least a portion of the light reflected from at least one of the distance measurement targets, wherein each of said filters are in contact with a surface of the optical displacement sensor having respective slits.

3. A triangulation-type optical displacement sensor having at least one light-emitting element for projecting light onto at least one target to which one or more distances being measured, and at least one light-receiving element for receiving at least a portion of the light reflected from at least one of the distance measurement targets and being disposed such that at least one light-receiving surface thereof is substantially perpendicular to at least one optical axis of at least a portion of the projected light, said at least one light-receiving element having a length that is longer than its width, comprising:

at least one straight and narrow slit for narrowing at least one light beam projected toward at least one of the distance measurement targets, and at least one light collecting element collecting at least a portion of the light reflected from at least one of the distance measurement targets, wherein said at least one slit has an opening that is long in a direction perpendicular to the length direction of the light-receiving element.

4. The optical displacement sensor according to claim 3, wherein said at least one of the light collecting elements is a cylindrical lens.

5. The optical displacement sensor according to claim 4, wherein at least one filter is arranged at an exit side of at least one of the slits narrowing said at least one of the light beams projected toward at least one of the distance measurement targets, wherein said at least one filter is in contact with a surface of the optical displacement sensor having the respective at least one of the slits.

6. The optical displacement sensor according to claim 3, wherein at least one filter is arranged at an exit side of at least one of the slits narrowing said at least one of the light beams projected toward at least one of the distance measurement targets, wherein said at least one filter is in contact with a surface of the optical displacement sensor having the respective at least one of the slits.

* * * * *